P. T. HANDIGES.
ADJUSTABLE BRAKE HEAD.
APPLICATION FILED OCT. 16, 1909.
980,516.
Patented Jan. 3, 1911.
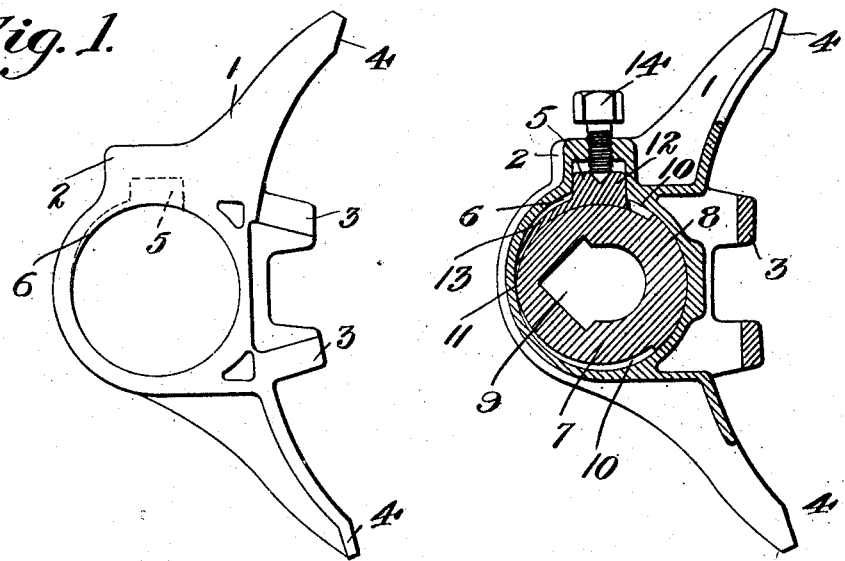
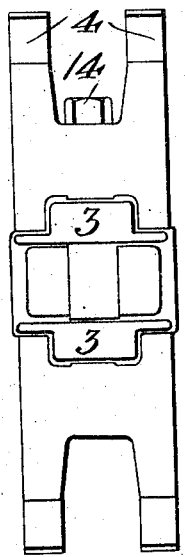
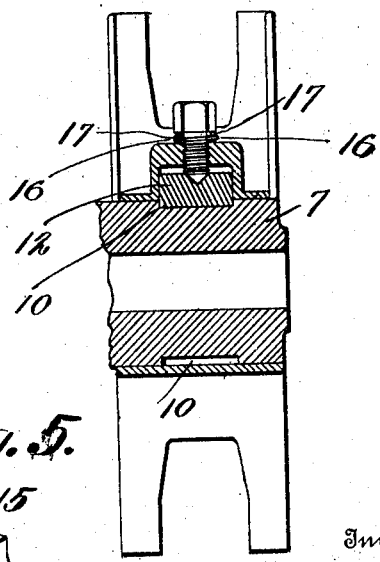
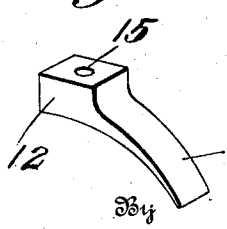
Witnesses
Inventor,
Philip T. Handiges
By
Knight Bros
Attorneys

UNITED STATES PATENT OFFICE.

PHILIP T. HANDIGES, OF CLEVELAND, OHIO, ASSIGNOR TO THE DAMASCUS BRAKE BEAM COMPANY, OF CLEVELAND, OHIO, A CORPORATION OF OHIO.

ADJUSTABLE BRAKE-HEAD.

980,516.   Specification of Letters Patent.   Patented Jan. 3, 1911.

Application filed October 16, 1909. Serial No. 523,103.

*To all whom it may concern:*

Be it known that I, PHILIP T. HANDIGES, a citizen of the United States, and resident of Cleveland, in the county of Cuyahoga and State of Ohio, have invented certain new and useful Improvements in Adjustable Brake-Heads, of which the following is a specification.

The present invention relates to adjustable brake heads for railway brakes, and has for its primary object to provide a device of that character with means for removably mounting the brake head upon the brake beam in such a manner as to positively hold the brake head against any rotary or axial displacement when set in position, and which has means for permitting adjustment of the head with respect to the periphery of the car wheel with which it coöperates.

The further purpose of the present invention is to provide a brake head and mounting therefor of the character in question whereby the same are better enabled to withstand the excessive thrust or pressure to which the brake shoes are subjected while in action; and which by reason of its structure is able to withstand or resist such thrust in proportion as it is exerted.

In addition to the foregoing advantages the present invention embodies other points of novelty which will be described in the following specification and set forth in the appended claims.

In the accompanying drawings which illustrate the invention by way of example,—Figure 1 is a side elevation of the brake head, Fig. 2 is a transverse sectional view of the same and its mounting, Fig. 3 is a front elevation, Fig. 4 is a vertical transverse section of Fig. 2, looking from the rear, and, Fig. 5 is a detail perspective view of the wedge.

Referring now to the structure in further detail, and with like characters of reference indicating corresponding parts in the different views shown, the numeral 1 designates the brake head proper which is formed with an integral enlargement 2 when casted, and 3 and 4 are the members for holding the brake shoe after the usual manner. The enlarged portion 2 is provided with a rectangular chamber 5 from which is extended rearwardly of the brake shoe a tapering channel or key-way 6.

The brake shoe 1 is mounted upon a sleeve 7 which sleeve is of substantially that type utilized in the structure shown in my copending application bearing the Serial Number 512,889, under date of August 14, 1909, and of which structure the present application constitutes a further improvement.

The sleeve 7 has the usual openings 8 and 9 adapted to receive respectively the truss rod and compression member comprising the brake beam. Said sleeve 7 is of perfect cylindrical design and has formed within its outer periphery, and substantially intermediate its ends, a pair of opposed grooves or key-ways 10 which taper in depth to a common point 11, which point is to the rear and on the horizontal medial line of the sleeve. The point 11 is also on the true circumference of the sleeve, as clearly shown in Fig. 2. The idea of having two key-ways 10 and disposing the same in opposed relation is merely to afford a means for effecting the reverse position or interchangeability of the sleeve and brake head. The length of the key-ways 10 is such as will permit the brake head to have a variable rotary adjustment.

For securing the brake head to its supporting sleeve there is provided a wedge block of preferably that design shown in Fig. 5. This member comprises a block 12 having formed integral therewith, and disposed in an arc, a wedge 13. In applied position the block 12 fits within the chamber 5 and the tapering wedge 13 lies within the adjacent key-way 10, and in this position the securing member is compressed or clamped by means of the screw bolt 14 that is mounted on the portion 2 of the brake head and centrally of the chamber 5. The impinging end of the bolt 14 fits within a recess 15 in the block 12. And for locking the bolt 14 there is a pin 16 which passes through the bolt and has its exposed ends lying between lugs 17, (see Fig. 4).

The dimensions of the securing member are substantially those of the recesses 5 and 6 formed in the brake head whereby the block 12 and wedge 13 may fit wholly therein in order that the brake head may fit over the end of the sleeve 7 when the parts are being assembled.

From the foregoing it will be seen that by reason of having the tapering wedge 13 fitting within a key-way of like proportion that any tendency for the brake head to rotate will cause said wedge to jam, and thus resist any thrust in that direction. And since the wedge portion lies within a key-way in the sleeve 7, it will withhold the brake head 1 against any axial displacement.

Through the medium of the block 12 lying within the recess 5 there is prevented any tendency for relative rotation between said block 12 and the brake head; and by means of the adjusting bolt 14, the block 12 may be clamped against the sleeve to the required degree of pressure.

Having thus described my invention, what I claim as new therein and desire to secure by Letters Patent, is:—

1. A brake head for brake beams, a sleeve on which the brake head is mounted, and a wedge lock interposed between the brake head and sleeve and constructed to effect its wedging action circumferentially of said head and sleeve.

2. A brake head for brake beams constructed with an arcuate groove, a sleeve on which said brake head is mounted having an arcuate groove complementary to the first named groove, and an arcuate wedge pin within said grooves and adapted to hold said brake head against axial or rotary displacement.

3. A brake head for brake beams, constructed with an arcuate tapering groove, a sleeve on which said brake head is mounted having an arcuate tapering groove complementary to the first named groove and providing a key-way therewith, an arcuate tapering wedge pin within said keyway adapted to hold said brake head against axial or rotary displacement, and a means for adjusting the wedge pin.

4. The combination with a brake head mounted on a support having a key-way, of a wedge pin seated within the key-way and adapted to hold the brake head against axial or rotary displacement, and a screw bolt mounted on the brake head and seating against the drift pin and adapted to compress the same.

5. The combination with a brake head having a key-way, of a sleeve on which said brake head is mounted having a key-way coöperating with the key-way of the brake head, and a wedge pin seated within said key-ways and adapted to hold the brake head against axial or rotary displacement.

6. The combination with a brake head having a chamber and a key-way therein, of a support on which the brake head is mounted having a key-way, and a block seated within the chamber having a wedge pin lying within sad key-ways and adapted to hold the brake head against axial or rotary displacement.

7. The combination with a brake head having a chamber and a key-way of tapering depth therein; of a sleeve on which the brake head is mounted having a key-way of tapering depth therein, and a block seated within the chamber and having a tapering wedge pin lying within the key-ways and adapted to hold said brake head against axial or rotary displacement.

8. The combination with a brake head having a key-way, of a sleeve on which said brake head is mounted having opposed key-ways tapering to a common point, either one of said sleeve key-ways adapted to coöperate with the key-way of the brake head, and receive a wedge pin; and a wedge pin within said coöperating key-ways adapted to hold said brake head against axial or rotary displacement.

9. The combination with a brake head having a chamber and a key-way, of a sleeve on which said brake head is mounted having a key-way formed within the ends thereof, a block having a wedge pin adapted to lie wholly within the chamber and key-way of the brake head whereby to be passed over the end of the sleeve; said wedge pin adapted to hold the brake head against axial or rotary movement; and a screw bolt on the brake head adapted to compress the wedge pin.

The foregoing specification signed at Cleveland Ohio this 13th day of October, 1909.

PHILIP T. HANDIGES.

In presence of—
A. D. McAdam,
G. W. Clemmons.